UNITED STATES PATENT OFFICE.

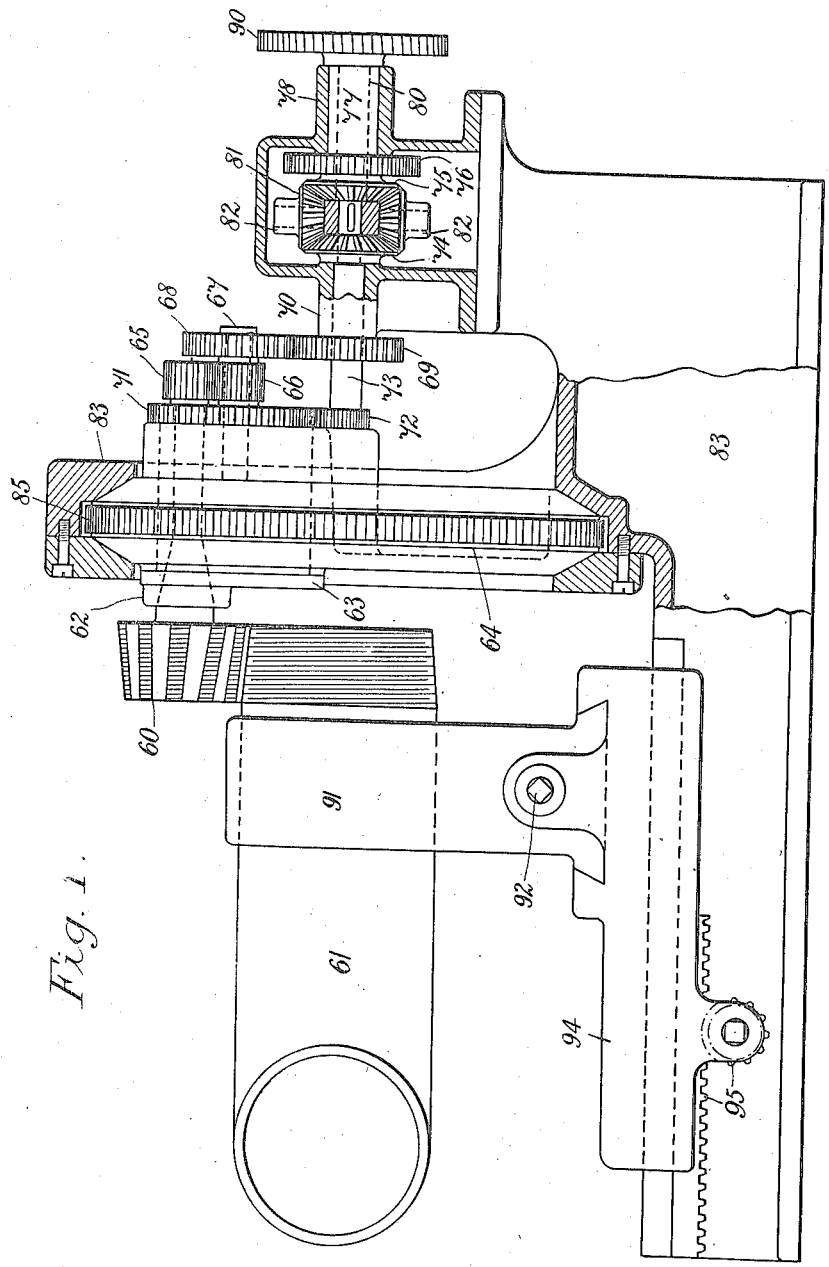

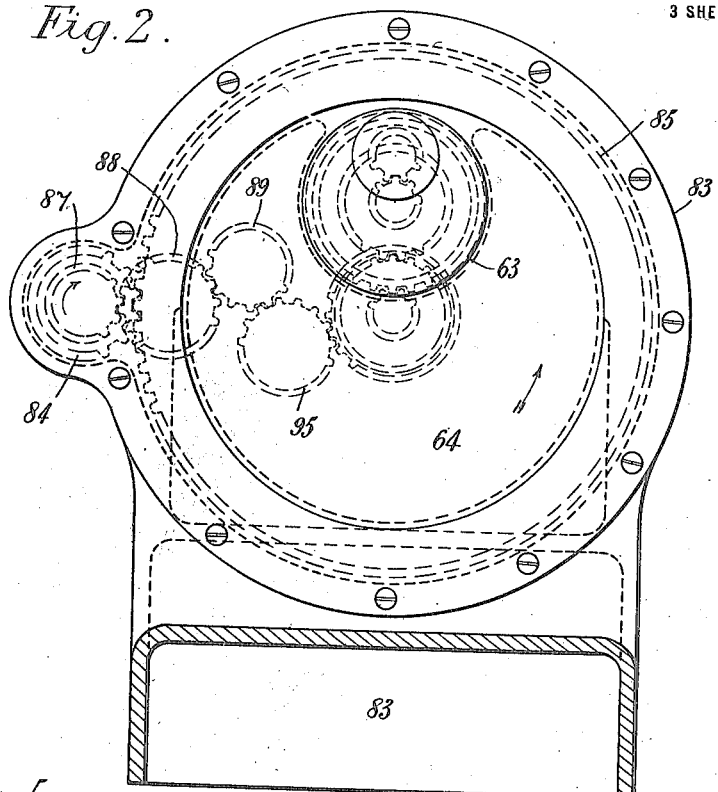
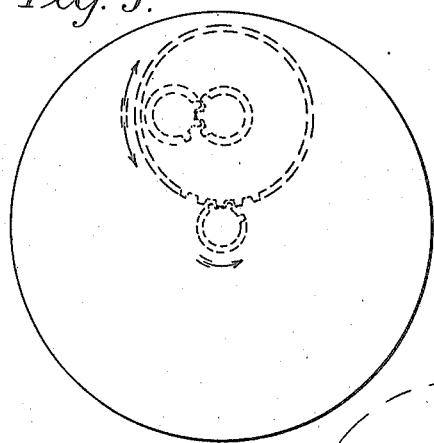
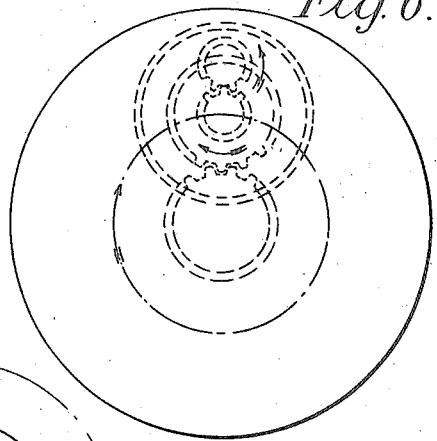
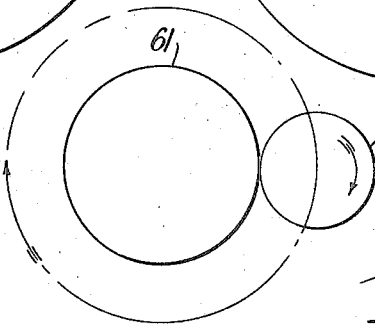

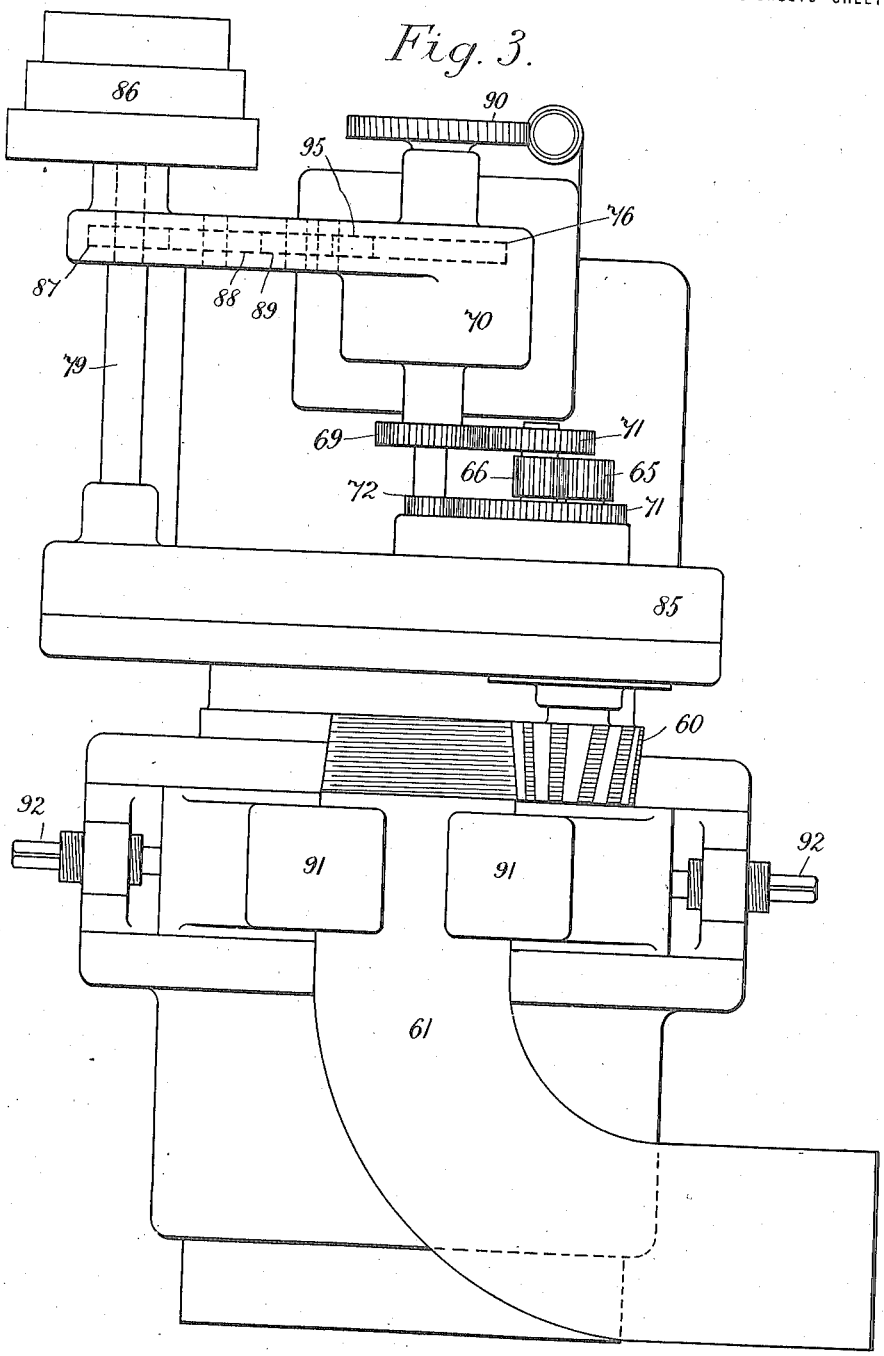

GEORGE RICHARDS, OF LONDON, ENGLAND.

MILLING SCREW-THREADS.

1,269,857.　　　　　　　Specification of Letters Patent.　　Patented June 18, 1918.

Application filed November 21, 1916. Serial No. 132,576.

*To all whom it may concern:*

Be it known that I, GEORGE RICHARDS, a citizen of the United States, and resident of London, England, have invented new and useful Improvements in Milling Screw-Threads, of which the following is a specification.

My invention relates to means for milling screw-threads in the surfaces of cylindrical pieces when such pieces are held stationary and have no rotative movement.

The formation of screw-threads by means of rotary cutters is effected by two different methods. According to one method, the cutting tool is fed gradually to the required depth of thread to be cut while the work and the cutter revolve at uniform rotative speeds. The cutting teeth are spiral, either right or left hand, with a pitch equal to that of the thread to be formed, and the cutter is termed a "hob" and makes many revolutions before the operation is complete, but neither the work nor the cutter partakes of any axial movement.

According to the other method of forming screw-threads by means of rotary cutters, the cutting teeth, instead of being spiral, are arranged in annular rings spaced at distances apart equal to the pitch of the thread to be formed. In this case, before the work commences its rotative movement, the cutter is fed into its surface to the full depth of the thread to be formed. A slow rotative movement is then imparted to the work, and the thread is completely formed during one revolution thereof; the cutter advancing during this period a distance in an axial direction equal to the pitch of the thread to be formed. Such a rotary cutter is termed a "milling cutter", as distinguished from a "hob".

According to my improved method of forming threads on work which does not revolve, I employ a rotary cutter of the "hob" type and I impart thereto two rotative motions; one on its own axis, and the other about the axis of the work. The result of these combined motions is equivalent to rotating the hob and the piece of work on their respective axes. By my invention, the milling of threads in the surfaces of steam and water tubes of large diameter is facilitated, inasmuch as the tube does not revolve during the thread-milling operation, but remains stationary. Tubes with bends and tubes of T-form can accordingly be threaded conveniently and expeditiously, the employment of "hobs" as distinguished from milling cutters being rendered permissible.

Referring to the accompanying drawings, in Figure 1 is illustrated a machine engaged in milling threads on one extremity of a tubular bend; Fig. 2 being an end-view, and Fig. 3 a plan of the same. Figs. 4, 5 and 6, are diagrams which will be referred to in explaining the operations of the hob.

In Fig. 1, 62 is a spindle which supports and rotates the hob 60. The spindle is mounted in a trunnion 63 which is free to oscillate in the plate 64, with the object of bringing the hob 60 to a suitable position relatively to the tube 61; and by the same motion of the trunnion 63, the hob is moved to the required extent to form the thread on any particular size of tube. Fast upon the spindle 62 is a pinion 65 which gears with the pinion 66; the latter being mounted to rotate freely on the stud 67 which is fixed in the trunnion 63. The stud 67 also carries a toothed wheel 68 which is fast upon the pinion 66 and meshes with the toothed wheel 69; the latter being stationary on the bracket 70. The trunnion 63 is also furnished with a toothed wheel 71; and the trunnion 63 can be oscillated by the rotation of the pinion 72 on the shaft 73 with the object hereinafter mentioned. The shaft 73 is keyed or attached to the bevel-wheel 74 and rotates in the bracket 70.

The differential gear shown is of the usual construction. The bevel-wheel 75, the toothed wheel 76 and the sleeve 77 are in one piece, revolving in the bearing 78 of the bracket 70, and are driven, as hereinafter explained, from the shaft 79 (see Fig. 3). The shaft 80 (Fig. 1) passes through the sleeve 77 and at one end is attached to the spider 81; while its opposite end carries the worm-wheel 90. The sprocket 81 carries bevel-pinions 82, 82, on studs in the usual manner. The plate 64 rotates in the frame 83 and is driven by the pinion 84 (Fig. 2) on shaft 79, (Fig. 3) through the teeth 85 on the exterior surface of the plate 64, as shown in Figs. 1 and 2. The shaft 79, (Fig. 3) is driven at speeds, to suit the different diameters of tubes or hobs, by the cone 86 in the usual manner. The driving shaft 79, carrying the toothed wheel 87, transmits motion to the toothed wheel 76 through the gear-train 87, 88, 89 and 95. The ratio of the toothed wheel 87 to the toothed wheel 76 corresponds with that of the pinion 84 to the toothed gear 85 on the plate 64. By means of the differential gear described, the rotative speed of the toothed wheel 76 is thus made to correspond with that of the plate 64. When the worm-wheel 90 is stationary, the toothed wheel 71 on the trunnion 63 and the pinion 72 have no motion relatively to one another. Any partial rotation of the worm-wheel 90 and the spider 81 will cause the differential gear to operate the shaft 73 and produce a partial rotation of the trunnion 63 through the pinion 72 and the toothed wheel 71. It will be understood how the partial rotation of the trunnion 63 can, by the differential gear-train, be obtained by the worm-wheel 90 during the time that the plate 64 is rotating.

The toothed wheel 69 being stationary, the toothed wheel 68 will be caused to make one revolution on its own axis and one revolution about the axis of the tube 61, by reason of its being carried around the toothed wheel 69 by the plate 64; which latter also carries the trunnion 63, the pinions 65 and 66 and the toothed wheel 68, in its rotation. The combination of the gear-trains described will cause the cutting teeth of the hob 60 to move in an opposite direction to that of the plate 64, as shown diagrammatically in Figs. 4 and 6.

In Fig. 4, the arrows show the direction of rotation of the hob on its axis during the period of its making a planetary movement about the axis of the tube 61; the combined movement causing the hob 60 to rotate on its own axis in a direction opposite to that which would occur were its cutting surface rolling upon the surface of the work.

In Figs. 1 and 2, the tube 61 is shown in clamp-jaws 91, 91, which are actuated by the screws 92, 92, in the usual manner; these jaws being adapted to suit tubes of different diameters. The jaws slide transversely in ways in the carriage 94; the latter being fitted to slide on the base 83 of the machine. The carriage 94 is moved longitudinally on the bed 83 by means of a rack and pinion 95.

I claim:—

1. In milling screw-threads in the surface of a piece of work which is held stationary, the herein described method of working according to which a "hob," while making one revolution on its own axis, makes one complete planetary movement about the axis of the work, but partakes of no axial movement, substantially as set forth.

2. In a machine for milling screw-threads in the surface of a stationary piece of work, the herein described means for rotating the hob-carrying spindle simultaneously with causing it to traverse a circular path about the axis of the piece of work; such means comprising an eccentrically mounted trunnion, a hob spindle mounted therein and a sun-and-planet motion in operative connection with the said trunnion, substantially as set forth.

3. In milling screw-threads in the surface of a piece of work which is held stationary, the herein described means whereby the hob is advanced to the required depth to form the thread while traveling concentrically about the axis of the work; such means comprising an eccentrically mounted trunnion, a hob-spindle mounted therein, a stud carried by the hob-spindle, a toothed wheel fixed on the stud, a fixed and centrally mounted toothed wheel meshing with the toothed wheel carried by the stud, a toothed wheel formed on or attached to the trunnion, a centrally mounted pinion meshing with the toothed wheel carried by the trunnion, and differential gear through which the centrally mounted pinion is driven, substantially as set forth.

GEO. RICHARDS.